United States Patent Office 3,414,461
Patented Dec. 3, 1968

3,414,461
NOVEL WOOD STRUCTURES AND
THEIR MANUFACTURE
Gordon E. Brown and Richard R. Huff, Seattle, Wash., assignors to Monsanto Company, a corporation of Delaware
No Drawing. Filed Sept. 24, 1963, Ser. No. 311,240
6 Claims. (Cl. 161—151)

This invention relates to a novel overlay for wooden substrates. More particularly, it relates to a novel plywood overlay system which provides functional durable, dimensionally stable and, if desired, decorative, surfaces.

Overlays for wooden substrates, e.g., plywood, are used for one or both of the following reasons; (1) to cover surface defects and blemishes so as to provide a surface which is either itself decorative or at least prepared for the application of a decorative finish, such as paint, lacquer, films, etc. and (2) to up-grade the functional, i.e., useful, properties, at least for specific applications, of the wooden substarte. For example, plywood, particularly in the poorer grade veneers, requires considerable patching and/or filling to prepare it for finishing. It is common practice to cut, for example, knotholes from veneers and then plug the holes with perfectly fitting plugs cut from other veneers or, alternatively, to wipe wood fillers into crevices and cracks to mask the defect. Another approach to the masking of surface blemishes is that taken by Welch (U.S. Patents 2,419,614 and 2,606,138) wherein the plywood surface is overlaid with a sawdust-resin mixture; such expedients, however, are merely decorative and do little or nothing to improve upon the functional properties of the substrate.

It is, for example, obvious that surfaces exhibiting durability under normal exterior use conditions and accelerated test conditions, such as for instance, significant resistance to, e.g., water and chemicals, checking, grain-raise, fiber pop-up, abrasion or denting during handling, etc., as well as exhibiting marked tensile strength in the overlay itself, as distinguished from the substrate, would find many uses. This latter requirement of strength in the overlay is important in securing the dimensional stability and continued surface integrity after aging necessary to a high quality and durable overlay. The high and medium density overlays, i.e., usually resin-impregnated paper sheets, presently on the market meet many of these requisites, but only at a premium price. They, therefore, have not found widespread use and many applications where cost is a prime factor remain unexploited. For example, re-usable concrete forms require the above as well as other functional properties. The mass market of home and commercial paneling also demands such properties. This is, therefore, a great need in the wood industry for a low cost overlay which provides functional properties comparable with or better than those obtained with high or medium density overlays.

It is, therefore, an object of this invention to provide novel overlays for wooden substrates and to provide a method for their manufacture.

Another object is the provision of novel overlays possessed of functional properties.

Another object is the provision of a method of improving the functional properties of plywood and hardboard surfaces.

A further object is the provision of wooden, e.g., plywood, structures having overlaid surfaces which are durable; e.g., resistant to water and chemicals, checking, grain-raise, fiber pop-up, abrasion, denting, etc., and which overlays possess sufficient tensile strength in their own right to provide superior surface integrity, i.e., continuity, and dimensional stability.

These and other objects are attained through the provision of overlaid wooden structures prepared by:

(a) Applying to at least one surface of a wood substrate a coating of an aqueous thermosetting resin (hereinafter referred to as Resin A), (b) Applying to said coated surface a layer of a mixture comprising (1) wood fibers having a bulk density of up to about 0.16 grams/cc. and (2) from about 5 to 50 weight percent, of resin solids based upon the dry weight of the wood fiber, of an aqueous phenol-formaldehyde resin (hereinafter referred to as Resin B).

(c) Applying to the surface of the wood fiber/phenolic resin layer a coating of Resin B, (d) Subjecting the resulting assembly to heat and pressure to consolidate and cure the assembly.

The following examples are presented in illustration of the invention and are not intended as limitation thereon.

The following Examples, I and II, illustrate, at two different overall moisture and resin contents, the preparation of overlaid plywood using as Resin B, i.e., the phenolic resin used in admixture with the wood fibers and in the overcoat, a variety of phenolic resins, including for comparative purposes several unacceptable resins. Each of the resins so used is characterized in Table A, following.

EXAMPLE I

This example illustrates overlaid plywood panels prepared using in the overlay formulation, including the undercoat resin (i.e., Resin A), the wood fiber-phenolic resin mixture and the overcoat, a total resin content of about 30% resin solids by weight based upon dry fiber and a total overlay moisture content, measured just prior to hot-press, of about 28% by weight based upon the dry fiber.

A series of 5-ply 13/16" Douglas fir plywood panels measuring 5" x 10" are uniformly spray coated with about 0.8 gram, per panel, of an aqueous alkaline solution of a phenolic resin containing about 30% resin solids by weight and prepared by condensing one molar proportion of phenol with about 2.1 molar proportions of formaldehyde in the presence of 0.6 molar proportion of sodium hydroxide under reflux conditions. To each coated panel is then applied, using a gravity duster, about 10 grams of a mixture of wood fibers having a bulk density of about 0.065 gms./cc. and a phenolic resin as characterized in Table A; in each instance the phenolic resin being employed in such proportion and in conjunction with drying to remove water such that the wood fiber-phenolic resin mixture contains about 22% resin solids by weight and about 8.5% moisture by weight. An overspray of 1.2 grams, per panel, of an aqueous solution containing about 40% resin solid by weight of the same phenolic resin used, in each instance, in the wood fiber-phenolic resin mixture is then applied. Finally, the entire assembly is hot pressed for 8 minutes at 300° F. and 175 p.s.i. to consolidate the structure.

EXAMPLE II

This example illustrates overlaid plywood panels prepared using in the overlay formulation, including the undercoat resin (i.e., Resin A), the wood fiber-phenolic resin mixture and the overcoat, a total resin content of about 39% resin solids by weight based upon dry fiber and a total overlay moisture content, measured just prior to hot-press, of about 37% by weight based upon the dry fiber.

Example I is repeated, preparing a corresponding series of overlaid plywood panels, but decreasing the quantity of the wood fiber-phenolic resin mixture applied in each instance to about 8.0 grams per panel and increasing the quantity of overspray in each instance to about 2.0 grams per panel.

TABLE A.—NATURE OF RESIN EMPLOYED IN FIBER-RESIN MIXTURE AND IN OVERSPRAY

| Example | Panel No. | Mol Ratio P/F/Cat. | Catalyst | pH | Solids (Wt. percent) | Viscosity [4] | Hours Cooked at 150° F. | No. Avg. Mol. Wt. |
|---|---|---|---|---|---|---|---|---|
| I and II | 1 | 1/2.25/0.05 | NaOH | 8.9 | 52 | 18 | 6.5 | 197 |
| I and II | 2 | 1/2.25/0.1 | NaOH | 9.1 | 52 | 18 | 3.75 | 220 |
| I and II | 3 | 1/1.5/0.2 | NaOH | 9.7 | 51 | 15 | 1.25 | 150 |
| I and II | 4 | 1/2.25/0.2 | NaOH | 9.5 | 53 | 23 | 2.4 | 230 |
| I and II | 5 | 1/3.0/0.2 | NaOH | 9.5 | 51 | 50 | 5.5 | 318 |
| I and II | 6 | 1/1.4/0.03 | Triethyl amine | 8.0 | 58 | 20 | <10 | 176 |
| I and II | 7 | 1/2.25/0.2 | Triethanol amine | 8.0 | 50 | 14 | <10 | 180 |
| I and II | 8 | 1/3.0/0.2 | Lime [1] | 6.0 | 40 | 15 | 2.75 | 243 |
| I and II | 9 | 1/2.25/0.2 | NaOH | 9.2 | 51 | [5] 66 | 3.75 | 415 |
| I and II | 10 | 1/2.25/0.2 | NaOH | 9.2 | 51 | [6] 1,050 | ([8]) | 654 |
| I and II | 11 | 1/2.25/0.2 | NaOH [2] | 6.5 | 39 | 15 | 2.4 | 230 |
| I and II | 12 | 1/2.25/0.2 | NaOH [3] | 6.1 | 48 | 14 | 2.4 | 230 |
| I and II | 13 [7] | 1/2.25/0.75 | NaOH | 11.0 | 40 | 250 | | 2,200 |

[1] Neutralized by bubbling $CO_2$ through the resin and filtering out $CaCO_3$.
[2] This is the resin used in preparing panel No. 4, but acidified with $H_2SO_4$.
[3] This is the resin used in preparing panel No. 4, but acidified with HCl.
[4] At 70° F. on the MacMichael 30d scale.
[5] This is the resin used in preparing panel No. 2, but bodied to a higher molecular weight and viscosity.
[6] This is the resin used in preparing Nos. 2 and 9 but bodied to a still higher molecular weight.
[7] A conventional plywood resin included for comparative purposes; see Table J.
[8] Bodying.

The following Examples III–IV compare the several overlaid plywood panels prepared in Examples I and II with respect to significant properties. These examples demonstrate the variety of B type resins which may be employed in the wood fiber-phenolic resin mixture and in the overcoat.

EXAMPLE III

Each of the plywood panels prepared in Examples I and II, and listed in Table A, is evaluated in the durability characteristics of fiber pop-up and surface integrity following aging by ecearatech 9____0an–n24auzms- following aging by the accelerated technique set forth in ASTM procedure D–1037–60T. As regards surface integrity, performance is rated on the degree of improvement over Douglas fir plywood. The fiber pop-up rating is measured as the percent of the total surface area roughened by swelling of the fibers in the surface; less than 10% being rated as good, 10–20% as fair and above 20% as poor. The results are summarized in Table B, below.

TABLE B.—ACCELERATED AGING

| Example I— (Moisture Content 28%, Resin Content 30%) | | | Example II— (Moisture Content 37%, Resin Content 39%) | | |
|---|---|---|---|---|---|
| Panel No. | Fiber Pop-Up | Surface Integrity | Panel No. | Fiber Pop-Up | Surface Integrity |
| 1 | Fair | Fair | 1 | Fair | Good. |
| 2 | Good | do | 2 | do | Do. |
| 3 | do | do | 3 | do | Fair. |
| 4 | do | do | 4 | Good | Do. |
| 5 | Fair | do | 5 | Fair | Do. |
| 6 [1] | Poor | Poor | 6 [1] | Poor | Poor. |
| 7 [1] | do | do | 7 [1] | do | Do. |
| 8 [2] | Good | Good | 8 [2] | Good | Good. |
| 11 [3] | Fair | Fair | 11 [3] | Fair | Do. |
| 12 [4] | do | do | 12 [4] | do | Do. |

[1] Properties improve to Good in each instance when panels are prepared using 20 minutes press time.
[2] Resin used was neutralized by bubbling $CO_2$ through the resin and filtering out $CaCO_3$.
[3] Caustic catalyzed resin used in preparing panel No. 4, but acidified to pH of 6.5 with $H_2SO_4$.
[4] Caustic catalyzed resin used in preparing panel No. 4, but acidified to pH of 6.1 with HCl.

The results shown in Table B demonstrate that the overlaid plywood panels of this invention compare excellently in aging characteristics with the considerably more costly medium (MDO) and high density overlays (HDO) currently employed. Note that the lime catalyzed and subsequently neutralized resin used in panel No. 8 provided uniformly good results comparable to high density overlay.

EXAMPLE IV

Each of the plywood panels prepared in Examples I and II, and listed in Table A, is evaluated for abrasion resistance, measuring the loss of weight for each panel after first 2000 and then 4000 revolutions of the Taber Abraser equipped with CS–17 wheels loaded to a total weight of 1000 grams. The results are summarized in Table C below:

TABLE C.—TABER ABRASION

| Example I—(Moisture Content 28%, Resin Content 30%) | | | Example II—(Moisture Content 37%, Resin Content 39%) | | |
|---|---|---|---|---|---|
| Panel No. | Wt. Loss (Gms.) at 2,000 Revs. | Wt. Loss (Gms.) at 4,000 Revs. | Panel No. | Wt. Loss (Gms.) at 2,000 Revs. | Wt. Loss (Gms.) at 4,000 Revs. |
| 1 | 0.329 | 0.712 | 1 | 0.050 | 0.094 |
| 2 | 0.162 | 0.314 | 2 | 0.054 | 0.101 |
| 3 | 0.112 | 0.474 | 3 | 0.068 | 0.116 |
| 4 | 0.156 | 0.460 | 4 | 0.080 | 0.152 |
| 5 | 0.118 | 0.239 | 5 | 0.084 | 0.151 |
| 8 [1] | 0.066 | 0.123 | 8 [1] | 0.072 | 0.120 |
| 9 | | 0.314 | 9 | 0.035 | 0.101 |
| 10 | | 0.518 | 10 | 0.055 | 0.094 |
| 11 [2] | 0.049 | 0.139 | 11 [2] | 0.048 | 0.082 |
| 12 [3] | 0.073 | 0.132 | 12 [3] | 0.051 | 0.087 |

[1] Lime catalyzed resin used was neutralized by bubbling $CO_2$ through the resin and filtering out $CaCO_3$.
[2] Caustic catalyzed resin used in preparing panel No. 4, but acidified to pH of 6.5 with $H_2SO_4$.
[3] Caustic catalyzed resin used in preparing panel No. 4, but acidified to pH of 6.1 with HCl.

The results shown in Table C demonstrate the superior performance of the preferred low pH, or neutralized, phenolic resins. Note panel Nos. 8, 11 and 12, made using acidified or neutralized phenolic resins. These panels exhibit uniformly superior resistance to abrasion regardless of total resin content whereas the higher pH phenolic resins used in panel Nos. 1–5 do not develop full abrasion resistance at lower total moisture and resin contents (Example I) but do provide superior abrasion resistance at higher total moisture and resin contents (Example II).

The following Examples, V–VII, demonstrate the criticality of the low bulk density wood fibers employed in the practice of this invention.

EXAMPLE V

This example illustrates overlaid plywood panels made using low bulk density wood fibers. The B type phenolic resin employed in admixture therewith and in the overspray is the lime catalyzed phenolic resin characterized in Table A, Supra, with respect to panel number 8.

A series of sixteen 5-ply 1/16" Douglas fir plywood panels measuring 5″ x 10″ are uniformly spray coated with about 0.8 gram, per panel, of an aqueous alkaline solution of a phenolic resin containing about 30% resin solids by weight and prepared by condensing 1.0 molar proportion of phenol with about 2.1 molar proportions of formaldehyde in the presence of 0.6 molar proportion of sodium hydroxide under reflux conditions. The panels are then divided into 4 groups of 4 panels each. Then to each panel in the several groups are applied, respectively, 6, 8, 10 and 12 grams of a mixture of wood fibers having a bulk density of about 0.065 gms./cc. and the lime catalyzed phenolic resin (described at panel No. 8 in Table A); said mixture having been prepared by admixing about 70 parts by weight of the 40% solids aqueous resin solution per 100 parts by weight, on a dry basis, of wood fibers and subsequently drying, at low temperature, to a moisture content of about 8.5% based upon the weight of dry fiber. An overspray of about 1.2 grams per panel, of the same 40% solids aqueous phenolic (lime catalyzed) resin solution is then applied to each of the sixteen panels. Finally, each panel is hot pressed for 8 minutes at 300° F. and 175 p.s.i. to consolidate the structure.

EXAMPLE VI

This example illustrates overlaid plywood panels made using medium bulk density particulate wood, the individual particles being more or less cubical in configuration as opposed to the more string-like or wooly fibers employed in the practice of this invention. The particulate wood employed has a bulk density of about 0.165 gms./cc. The B type phenolic resin employed in admixture therewith and in the overspray is again the lime catalyzed resin characterized in Table A, supra, with respect to panel number 8.

Example V is repeated substituting this medium bulk density particulate wood for the low bulk density wood fibers used in the wood-resin mixture.

EXAMPLE VII

Each of the plywood panels prepared in examples V and VI are evaluated with respect to (a) water resistivity and (b) the durability characteristics of fiber pop-up and surface integrity. The water resistivity is measured by cutting 1″ x 3″ rectangular samples from each of the 4 panels in each group, immersing these samples in water at room temperature for 24 hours and then measuring the linear expansion over the 3″ span and the increase over original thickness. The durability characteristics are determined using the accelerated aging technique set forth in ASTM procedure D-1037-60T, rating each panel on comparative basis described in Example III. The results are summarized in Table D, below.

TABLE E

| Surface Property | Panel No. 8 of Ex. 1 | Douglas fir plywood | Medium Density Overlay | High Density Overlay |
|---|---|---|---|---|
| Fiber Pop-up | Excellent | | Good | |
| Grain Raise | Good | Poor | Excellent | Good. |
| Check Resistance | Excellent | do | do | Do. |
| Color Fastness | Good | do | Good | Do. |
| Surface Integrity | Excellent | | Poor | Excellent. |

In the following Table F, comparison of various important surface properties is made between panel No. 8 of Example I and ordinary Douglas fir plywood as well as commercial medium and high density overlay panels.

TABLE F

| Surface Property | Panel No. 8 of Ex. 1 | Douglas fir plywood | Medium Density Overlay | High Density Overlay |
|---|---|---|---|---|
| Abrasion Resistance | Excellent | Poor | Poor | Good. |
| Cut Resistance | do | do | do | Excellent. |
| Mar and Dent Resistance | do | Fair | do | Good. |
| Paint Hold-out | Good | Poor | Good | Excellent. |
| Paint Adhesion | do | Fair | Excellent | Good. |
| Chemical Resistance | do | Poor | Poor | Do. |

The results shown in Table D demonstrate the superiority of the use of wood fibers as opposed to other, non-fibrous, types of wood particles. Particularly note the superior water resistivity of the low bulk density (fibrous) type wood as compared with the medium bulk density (non-fibrous) type wood particles.

The following Examples VIII–IX, demonstrate the effect which total resin content and total moisture content of the overlay have upon performance of resulting panels with respect to the significant properties of abrasion resistance and aging.

EXAMPLE VIII

A series of 5-ply 13/16″ Douglas fir plywood panels measuring 5″ x 10″ are prepared according to the specifications listed in Table G following. In each instance, the glue-line or undercoat adhesive, i.e., Resin A, is an aqueous alkaline solution of a phenolic resin containing about 30% resin solids by weight and prepared by condensing 1.0 molar proportion of phenol with about 2.1 molar proportions of formaldehyde in the presence of 0.6 molar proportion of sodium hydroxide under reflux conditions. Similarly, in each instance, the B type phenolic resin employed in admixture with the wood fibers and in the overspray is the lime catalyzed phenolic resin characterized in Table A, supra, with respect to panel number 8. Low bulk density wood fibers having a bulk density of about 0.065 gms./cc. are also used throughout. On all of the "B" and "C" series panels a measured quantity of

TABLE D

| Fiber-Resin (Gms./ 50 sq. In.) | Relative Bulk Density | Moisture Content,[1] percent | Resin Content,[2] percent | Fiber Pop-Up | Surface Integrity | Water Resistivity | |
|---|---|---|---|---|---|---|---|
| | | | | | | Length (Mils) | Thickness (Mils) |
| 6 | Medium | 38.2 | 52.7 | Poor | Fair | 13.5 | 1.0 |
| 6 | Low | 38.2 | 52.7 | Good | do | 4.0 | 0.0 |
| 8 | Medium | 30.0 | 38.6 | Poor | do | 11.5 | 1.5 |
| 8 | Low | 30.0 | 38.6 | Good | do | 8.0 | 0.5 |
| 10 | Medium | 30.6 | 30.2 | Poor | do | 15.0 | 1.5 |
| 10 | Low | 30.6 | 30.2 | Good | Good | 10.5 | 0.5 |
| 12 | Medium | 31.5 | 25.4 | Fair | Fair | 14.0 | 1.5 |
| 12 | Low | 31.5 | 25.4 | Very good | Very good | 10.0 | 0.5 |

[1] Total moisture content of overlay only, measured ust prior to hot pressing; percent by weight based upon dry fiber.
[2] Total resin content of overlay; percent resin solids by weight based upon dry fiber.

In the following Table E, the accelerated aging properties of panel No. 8 prepared in Example I, i.e., using the lime catalyzed resin, are compared with ordinary Douglas fir plywood and with commercial medium and high density overlay panels. In each instance the accelerated aging technique set forth in ASTM procedure D-1037-60T.

water is sprayed onto the surface of the fiber/resin mat prior to application of the overspray so as to raise the total moisture content as shown in Table E. All panels are hot pressed for 8 minutes at 300° F. and 175 p.s.i. to consolidate the structure. Note that panel series "A," "B" and "C" draw comparisons at three different moisture levels while the individual panels within each series present a spread in resin content; e.g., panels A-1, B-1 and C-1 being relatively comparable in resin content, but at different moisture contents, and so forth.

vention. In this example, presented for its probative value, the overlay surface is prepared as a separate unit, unattached to any substrate.

TABLE G

| Panel | Underspray (gms.) | Fiber/Resin Mixt. | | | Water (gms.) | Overspray (gms.) | Total Moisture Content, percent | Total Resin Content, percent |
|---|---|---|---|---|---|---|---|---|
| | | Gms. Appl. | Percent Resin Solid | | | | | |
| A-1 | 0.8 | 16.5 | 11.1 | | None | 1.2 | 12.9 | 15.5 |
| A-2 | 0.8 | 12.7 | 14.8 | | None | 1.2 | 16.8 | 20.9 |
| A-3 | 0.8 | 9.9 | 17.8 | | None | 1.2 | 17.7 | 25.0 |
| A-4 | 0.8 | 8.6 | 22.0 | | None | 1.2 | 18.8 | 30.4 |
| B-1 | 0.8 | 16.3 | 11.1 | | 1.8 | 1.2 | 26.6 | 17.2 |
| B-2 | 0.8 | 12.8 | 14.8 | | 1.1 | 1.2 | 26.6 | 20.7 |
| B-3 | 0.8 | 11.4 | 17.8 | | 0.7 | 1.2 | 23.5 | 24.2 |
| B-4 | 0.8 | 8.1 | 22.0 | | 0.6 | 1.2 | 27.0 | 31.1 |
| C-1 | 0.8 | 16.4 | 11.1 | | 3.3 | 1.2 | 31.3 | 15.5 |
| C-2 | 0.8 | 12.8 | 14.8 | | 2.1 | 1.2 | 33.0 | 20.4 |
| C-3 | 0.8 | 12.5 | 17.8 | | 1.7 | 1.2 | 30.8 | 23.6 |
| C-4 | 0.8 | 8.3 | 22.0 | | 1.4 | 1.2 | 36.5 | 30.8 |

EXAMPLE IX

Each of the plywood panels prepared in Example VIII are evaluated in (a) abrasion resistance and (b) the durability characteristics of fiber pop-up, checking and grain-raise. The abrasion resistance is determined measuring the decrease in panel thickness after first 2000 and then 4000 revolutions of the Taber Abraser equipped with CS-17 wheels loaded to a total weight of 1000 grams. The durability characteristics are determined using the accelerated aging technique set forth in ASTM proccedure D-1037-60T. Fiber pop-up is measured as the percent of the total surface area roughened by swelling of the fibers in the surface; less than 10% being rated as good, 10-20% as fair and above 20% as poor. Both check resistance and resistance to grain rise are visually observed, using high density overlay as standard with a rating of fair. The results are summarized in Table H, below.

EXAMPLE X

In a series of four experiments, the wood fiberphenolic resin mixture employed in Example V is uniformly dusted upon a moving belt forming mats of about 6, 8, 10 and 12 grams per 50 square inches, respectively. Each mat is then transferred to a fine copper screen backed by a plywood blank, using a vacuum transfer screen. Each mat is then uniformly oversprayed with about 1.2 grams per 50 square inches of the same lime catalyzed phenolic resin (i.e., Resin B) used in Example IV. A stainless steel caul is placed over the sprayed surface and the entire assembly is hot pressed for 8 minutes at 300° F. and 175 p.s.i. pressure. The resulting overlays are peeled from the screens and four strips measuring ¾" wide are cut from each overlay. The tensile strength of each strip is then measured on a standard paper tensile machine and the results reported in Table I, below: Each value repre-

TABLE H

| Panel | Total Moisture Content, Percent | Total Resin Content, Percent | Mils Thickness Loss at— | | Fiber Pop-Up | Check Resistance | Grain-Rise Resistance |
|---|---|---|---|---|---|---|---|
| | | | 2,000 Revs. | 4,000 Revs. | | | |
| A-1 | 12.9 | 15.5 | 5.7 | 10.5 | Poor | Good | Good. |
| A-2 | 16.8 | 20.9 | 1.8 | 5.2 | Fair | do | Fair. |
| A-3 | 17.7 | 25.0 | 1.0 | 2.8 | do | do | Do. |
| A-4 | 18.8 | 30.4 | 4.0 | 8.0 | do | do | Do. |
| B-1 | 26.6 | 17.2 | 1.0 | 2.0 | do | do | Do. |
| B-2 | 26.6 | 20.7 | 1.0 | 5.0 | Poor | do | Poor. |
| B-3 | 23.5 | 24.2 | 1.0 | 2.0 | Fair | do | Good |
| B-4 | 27.0 | 31.1 | 1.0 | 1.0 | | | |
| C-1 | 31.3 | 15.5 | 2.0 | 3.0 | Fair | do | Good |
| C-2 | 33.0 | 20.4 | 1.7 | 3.9 | | | |
| C-3 | 30.8 | 23.6 | 1.0 | 1.7 | do | do | Fair. |
| C-4 | 36.5 | 30.8 | <0.5 | 0.8 | | | |

The results shown in Table H demonstrate improvement in abrasion resistance with (a) increasing total moisture content with a leveling off at about 25% moisture content and (b) increasing total resin content; although the effect of the latter is much smaller. Fiber pop-up decreases with increase in the total resin content and is practically eliminated in overlaid surfaces having a resin content above about 40%. Grain raise resistance is seen to be chiefly a factor of moisture content and surface thickness, increasing with surface thickness and decreasing with increasing moisture content. Check resistance is seen to vary directly with the total overlay thickness.

The following Example X, is presented for the purpose of demonstrating the strength of the overlays of this insents the average of four strips and is expressed as the number of pounds tension required to break the ¾" wide strip.

TABLE I

| Fiber-Resin (Gms./50 sq. in.) | Moisture Content,[1] percent | Resin Content[2] percent | Strength (Lbs.) |
|---|---|---|---|
| 6 | 38.2 | 52.7 | 15 |
| 8 | 30.0 | 38.6 | 30 |
| 10 | 30.6 | 30.2 | 40 |
| 12 | 31.5 | 25.4 | 65 |

[1] Total moisture content of overlay only, measured just prior to hot pressing; percent by weight based upon dry fiber.
[2] Total resin content of overlay; percent resin solids by weight based upon dry fiber.

Various types of wood substrates may advantageously be overlaid in accordance with this invention. Plywood is, of course, most commonly treated in this fashion and is of particular utility in this regard. However, particle board is making significant inroads in, e.g., paneling, etc. and may admirably be overlaid in this fashion. Similarly, lumber material may advantageously be overlaid in this fashion. In brief, wood in any shape or form may be employed as the substrate in the practice of this invention.

One or more surfaces of the wooden substrate may be overlaid in accordance with this invention. However, in many instances it will not be necessary that all surfaces of the substrate be so treated. For example, except for only exceptional uses, plywood is generally furnished with only one finished face. Similarly, the products of this invention may only require one functional surface for many intended uses, e.g., wall paneling, flooring, counter-tops, etc. In other uses, e.g., as reuseable concrete forms, all surfaces may be overlaid.

As heretofore stated, the resins employed in formulating the overlays of this invention may be divided into two classifications in terms of their manner of use in the overlay. For clarity of discussion herein, the thermosetting resin applied to the substrate as a glueline or undercoat has arbitrarily been designated Resin A and the aqueous phenol-formaldehyde resin used in the wood fiber/phenolic resin mixture and in the overcoating has arbitrarily been designated as a B type phenolic resin.

It has been observed that little or no criticality exists as to the nature of Resin A. The Examples show the use of a highly alkaline phenolic resin of the type taught in many patents; e.g., Redfern Re. 23,347, Van Epps 2,360,-376, Stephan et al. 2,437,981, etc. However, equivalent results may be obtained substituting any thermosetting adhesive resin such as, for example, other phenol-formaldehyde condensates, aminoplasts such as, e.g., melamine-formaldehyde, urea-formaldehyde, etc., condensates, epoxy resins, proteinaceous adhesives, etc. The resins are generally employed in the form of aqueous solutions or dispersions. A coverage of at least 0.5 and preferably at least 1 pound, based upon resin solids, per 1000 square feet of substrate surface has been found desirable to prevent possible delamination of the overlay from the substrate during subsequent use. A commercially practical range of from about 1 to 3 pounds per 1000 square feet balances cost against performance to provide excellent results. However, similarly excellent results have been observed using 10 pounds, or more, based upon resin solids, per 1000 square feet.

There is, however, a great deal of criticality in the nature of the B type resin in order that the overlay prepared shall have the desired functional properties. Resin B is then an aqueous solution of an alkaline-catalyzed phenol-formaldehyde resole characterized by having a number average molecular weight of from about 105, i.e., monomethylol phenol, to 5000 and containing an average of from about 1.0 to 3.0 mols, and preferably from about 2.0 to 3.0 mols, of combined formaldehyde per mol of phenol. In a preferred embodiment, phenolic resins having a number average molecular weight of from about 140 to 550 are employed as providing superior ultimate functional properties. As a further refinement, maximum functional properties are obtained using, as Resin B, phenolic resins which have been prepared using milder alkaline, e.g., lime, catalysts which serve to maximize the molar ratio of formaldehyde to phenol in the resin at relatively low molecular weights. The color of the overlay is greatly improved by using at least partially neutralized or even acidified resins; e.g., having a pH of from about 4 to 8.

In the wood fiber/phenolic resin mixture, it is generally preferred to employ from about 5 to 50 weight percent, of resin solids based upon dry wood fiber, of the B type resin. At less than about 5% resin content, the desired functional properties of the finished overlay are not obtained, while at greater than about 50% resin content the mixture become difficult to deposit on the substrate. Best performance is obtained using from about 7 to 20 weight percent of resin solids, with optimum results being obtained at about 12 to 14 weight percent.

As stated, the B type resin is also used as the overcoating resin, i.e., as the resin coating applied to the surface of the previously deposited wood fiber/phenolic resin mixture. In this regard, it has been found that a coverage of at least 1, and preferably at least 2, pounds, based upon resin solids, per 1000 square feet of substrate surface is desirable to insure good surface integrity; i.e., continuity of surface without free fibers appearing in the surface. Economically, coverages of more than about 15 pounds per 1000 square feet cannot be justified. Generally, a maximum coverage of about 6 pounds per 1000 square feet is preferred and a range of from about 3 to 4 pounds per 1000 square feet appears optimum in terms of performance and cost.

In various embodiments, in this overcoating and/or in the resin/fiber mixture, Resin B may contain as modifiers, various polymeric and/or non-polymeric compositions. For example, the addition of an oil or wax to the resin solution improves the water-resistivity as well as the angle, i.e., durability and weathering characteristics of the overlay. Such oil or wax modifiers are particularly pertinent, for example, to the provision of reusable concrete forms, providing a lubricated surface to aid in separating the form from the concrete. Partability may also be provided using soaps, surfactants or other parting agents as modifiers. Aqueous emulsions or suspensions of vinyl or vinylidene polymers such as, e.g., styrene-maleic anhydride copolymers, polyvinyl alcohol polymers, polyvinyl acetate polymers, etc. may be incorporated as modifiers to impart specialized surface properties to the overlay, e.g., flexibility, plasticization, etc. Again, in other embodiments, decorative materials such as pigments, metal flake, stone chips, silica, wollastonite, etc., may be added to the overcoating resin solution, i.e., to Resin B, to provide surfaces which are decorative as well as functional Similarly, other resins such as melamine-formaldehyde, urea-formaldehyde, acrylic, epoxy, etc., resins may be added.

Turning now to discussion of another crtical factor necessary to obtain the desired functional properties, it has been found that not all types of particulate wood can be used. Particulate wood of the type characterized by sawdust and sanderdust, that is, more or less cubical or otherwise regular in shape, cannot be used in the practice of this invention since they fail to provide the functional properties sought. Rather, the wood particles employed in the practice of this invention are fibrous; i.e., dimensionally irregular in the sense of having a single dimension of significantly greater magnitude than the other dimensions. Thus, acceptable wood fibers may be visualized as resembling match sticks, wool, strings, etc. For more accurate definition, the acceptable wood fibers are delimited herein by their bulk density, as measured by a method hereinafter set forth, which provides a measurable indication of their shape. Thus, for the purpose of this invention, wood fibers having a bulk density of up to about 0.16 grams/cc. have been found to provide overlays having suitable functional properties. Best results, however, are obtained using wood fibers having a bulk density of 0.10 grams/cc. or less. In the examples contained herein two types of wood fibers have been used for comparative purposes. On the acceptable side, there is used low bulk density wood fibers having a bulk density of about 0.065 grams/cc. On the unacceptable side, there is used medium bulk density wood particles having a bulk density of about 0.165. When interpreting the results reported herein it must be rememembered that the unacceptable wood particles are only silghtly outside of the acceptable range and still provide measurable though unacceptable functional properties. They are not to be considered comparable to sawdust or sanderdust which provide considerably worse and totally unacceptable functional properties.

The wood fibers employed in the practice of this invention may be prepared, for example, by defibrating steamed or unsteamed wood chips in a conventional defibrator, e.g., Bauer, Asplund, etc. The defibrator plates may be preset to provide wood fibers of the desired bulk density. While it is preferred to employ wood fibers obtained from soft woods such as, for example, Douglas fir, Hemlock, Pine, Cedar, White Fir, etc., fibers, any available species of wood may be used. Thus, results equivalent to those set forth in the Examples are obtained using, for example, Gum, Willow, Poplar, Cherry, Birch, Persimmon, Sycamore, Ash, Elm, Maple, Beech, Hackberry, Oak, Hickory, etc.

The bulk densities delimited herein with respect to the wood fibers are determined according to the following procedure. Five hundred ml. of loosely dispersed wood fibers discharged from an agitator are collected in a 500 ml. graduate. A 100 gram weight having a diameter slightly less than the inside diameter of the graduate is set down lightly on top of the fibers. The graduate is then placed for 1 minute in a vibrator having a displacement of about 0.165 inch and running at a rate of about 1225 oscillations per minute. The volume of wood fibers in the graduate is then noted and the wood fibers are weighed.

With regard to the quantity of wood fiber/phenolic resin mixture employed, it is merely necessary to employ sufficient to form a finished, or consolidated, overlay having sufficient thickness to provide adequate functional properties. For example, it has been observed that a total consolidated overlay thickness of at least about 6 mils is desired to provide the requisite strength and other functional properties. As a practical matter, there appears to be no apparent advantage in providing overlays having a total consolidated thickness in excess of about 50 mils. A range of from about 10 to 20 mils and particularly about 13 to 15 mils appears to be preferable.

At this point, it would be well to mention moisture content, which has been found to play an important role, and which is interrelated with the molecular weight of the B type resin. The interdependence of the total moisture content with the molecular weight of Resin B is such that total overlay moisture contents falling within the following prescribed maximums and minimums, as measured just prior to hot-pressing and based upon dry wood fiber, should be observed:

$$\text{minimum moisture content} = \frac{\overline{M}n}{240} + 15$$

$$\text{maximum moisture content} = \frac{\overline{M}n}{200} + 40$$

where $\overline{M}n$ represents the number average molecular weight of the B type Resins used in the wood fiber/phenolic resin mixture and in the overspray, taken in combination. Moisture, if any, present in the wood veneers of the sub-strate is not included in calculating the total overlay moisture content.

Thus, a total overlay moisture content of from about 15 to 65 weight percent, based upon dry wood fiber, has been found to be desirable. At less than the prescribed minimum moisture, the finished overlay exhibits poor surface integrity and low abrasion resistance. Moreover, the surface lacks the requisite strength. At more than the prescribed maximum moisture content the wood becomes darkened and there is excessive grain raise. Preferably, total overlay moisture contents of from about 18 to 25% are employed.

Table J, following, illustrates the above discussed effects of overlay moisture content in relation to the molecular weight of the B type resin using representative panels prepared in Example I (note Table A). The aging test and Taber Abraser test employed are those set forth in Examples III and IV, respectively.

TABLE J

| Panel from Ex. 1 | Molecular Wt. (Mn) | Surface (a) Integrity | | | Taber Abraser (b) Loss | | |
|---|---|---|---|---|---|---|---|
| | | 28% M.C. | 37% M.C. | 50% M.C. | 28% M.C. | 37% M.C. | 50% M.C. |
| #8 | 243 | Good | Good | | 0.123 | 0.120 | 0.096 |
| #9 | 415 | Fair | do | Good | 0.314 | 0.101 | 0.092 |
| #10 | 654 | Poor | do | do | 0.518 | 0.094 | 0.079 |
| #13 | 2,200 | Very poor | Very poor | do | 0.725 | 0.199 | 0.124 |

In brief, the process of this invention comprises: (a) applying to the surface of a wood substrate a thin coating of Resin A, (b) depositing thereon the wood fiber/phenolic resin mixture (Resin B), (c) applying an overcoating of a B type resin, and (d) hot pressing the consolidated structure.

Resin A, i.e., the glue-line or undercoating resin, may be applied by a conventional technique. Good results have been obtained using a spray coating technique. However, equivalent results are obtainable using other conventional coating methods such as, e.g., curtain coating, glue spreader, felt roll, etc. It has been observed that the coated panel may be set aside or stored for several hours or even overnight before proceeding to the next step. Therefore, it is not necessary in the practice of this invention to endeavor to control or minimize drying of the glue-line prior to deposition of the wood fiber mat.

The wood fiber/phenolic resin mixture is then deposited upon the coated surface. Excellent results have been obtained by felting out a uniform mat from a conventional air-borne fiber felter. In variations on this embodiment, the mat may be felted on the coated panel or more preferably, may be felted on a vacuum screen and then transferred to the coated substrate. Various transferal methods are known to the art; e.g., vacuum transfer units.

In one variation the felted mat may be rolled up, i.e., similar to batting, and later unrolled upon the coated substrate. Others means for securing deposition of the wood fiber/phenolic resin mixture on the coated substrate will, of course, be obvious to those skilled in the art.

The overcoating of the B type resin may also be applied by any conventional technique. Again, good results have been obtained using spray coating. However, other means, e.g., curtain coating, etc., capable of depositing relatively uniform coatings without disrupting the fibrous structure may be employed.

The overlay is then consolidated under pressure and heat. It may be well, at this point, to refer back to earlier comments made with respect to the moisture content of the overlay. It is desirable to hot press the structure within a period of time such that the total moisture content is within the heretofore delimited range. More preferably, however, hot pressing is effected while the moisture concentration in the overcoating is greater than that in the wood fiber/phenolic resin mat. This requires pressing before the overlay structure reaches equilibrium with respect to moisture. Conventional plywood pressing conditions are employed, but it is to be understood that this invention is not limited in this regard. Typical pressing temperatures are from 240 to 320° F. In general, the pressing cycle employed can be considerably shorter than that used in preparing conventional high density overlays.

The functional overlays provided by the practice of this invention are possessed of a multitude of desirable surface properties. For examples, surfaces which are resistant to abrasion, water, grain-raise, checking, alkalies, physical damage during handling, etc. are obtained. These features, when combined with the excellent tensile strength of the surface, renders plywood panels, so constructed, suitable for use as, e.g., reusable concrete forms, structural panels for home and industrial use, etc. It has also been observed that the surfaces obtained require no further preparation for finishing with, e.g., paint, baking enamels, etc. In this latter regard, the surfaces exhibit good adhesion, good paint hold-out, low permeability, superior surface integrity and strength to resist blistering and to provide a smooth grain-free surface. However, with regard to paint hold-out, the additional use of a paper sheet in the overlay provides more uniform results. If desired, decorative thermoplastic films may be applied. These panels will also find significant use in applications wherein the surfaces are subjected to wear; e.g., countertops, floors, subflooring, etc.

The following Example XI, illustrates an embodiment of this invention wherein paint hold-out is even further improved through the inclusion of paper sheets in the overlay surface.

EXAMPLE XI

Duplicate 5-ply 13/16" Douglas fir plywood panels, i.e., panels A and B, measuring 5" x 10" are uniformly spray coated with about 0.8 gram, per panel, of an aqueous alkaline solution of a phenolic resin containing about 30% resin solids by weight and prepared by condensing 1 molar proportion of phenol with about 2.1 molar proportions of formaldehyde in the presence of 0.6 molar proportion of sodium hydroxide under reflux conditions. Then to each panel is applied 10 grams of a mixture of low bulk density wood fibers having a bulk density of about 0.065 gms/cc. and the lime catalyzed phenolic resin (described at panel No. 8 in Table A); said mixture having been prepared by admixing about 70 parts by weight of the 40% solids aqueous resin solution per 100 parts by weight, on a dry basis, of wood fibers and subsequently drying, at low temperature, to a moisture content of about 8.5% based upon the weight of dry fiber. An overspray of about 1.2 grams per panel, of the same 40% solids aqueous phenolic (lime catalyzed) resin solution is then applied to each panel. One panel, A, is set aside and is at this point ready for hot pressing. To the oversprayed surface of panel B is then applied a single sheet measuring 5" x 10" of 11½ lb. paper (i.e., 3 ⅝ lb. per 1000 square feet). Both panels are then hot pressed for 8 minutes at 300° F. and 175 p.s.i. to consolidate the structure. The paint hold-out qualities of panels A and B are then evaluated by spray applying to the surface of each panel a uniform 0.003" film of a commercial short oil alkyd priming paint and then drying the panels under infrared. Panel A is observed to have absorbed the paint excessively in blotchy areas covering up to about 40% of the surface area whereas panel B is uniformly covered throughout.

It is obvious that many variations may be made in the products and processes set forth above without departing from the spirit and scope of this invention.

What is claimed is:

1. The method of making a wood product having a functional overlay thereon, which method comprises:
   (a) applying to the surface of a wood substrate a coating of an aqueous thermosetting resin solution in proportions of from about 0.5 to 10 pounds, based upon resin solids, per one thousand square feet of substrate surface,
   (b) applying to the coated surface a layer of a mixture comprising
      (1) wood fibers having a bulk density of up to about 0.16 grams/cc. and
      (2) from about 5 to 50 weight percent, of resin solids based upon dry wood fibers, of an aqueous phenol-formaldehyde resole resin solution,
   (c) applying to the surface of the fibrous layer a coating of an aqueous phenol-formaldehyde resole resin solution in proportion of from 1 to 15 pounds, based upon resin solids, per one thousand square feet of substrate surface, and
   (d) subjecting the resulting assembly to heat and pressure to consolidate the assembly;

said aqueous phenol-formaldehyde resole resin solutions employed in steps (b) and (c) being independently selected aqueous solutions of an alkaline catalyzed phenol-formaldehyde condensate having a number average molecular weight of up to about 5000 and containing an average of from 1.3 to 3.0 mols of combined formaldehyde per mol of phenol; the total moisture content of the several components of the overlay as applied in steps (a), (b) and (c) and as measured just prior to hot-pressing and expressed as percent by weight of water based upon the dry wood fiber being within the range of from about $$\text{minimum moisture content} = \frac{\overline{M}n}{240} + 15$$

to about $$\text{maximum moisture content} = \frac{\overline{M}n}{200} + 40$$

wherein $\overline{M}n$ is the number average molecular weight of the aqueous phenol-formaldehyde resole resins employed in steps (b) and (c).

2. A method as in claim 1 wherein the total consolidated thickness of the overlay is from about 6 to 50 mils.

3. A wood product comprising a wood substrate having a functional overlay cohesively bonded to at least one surface thereof, as prepared by the method of claim 1.

4. The method of making a wood product having a functional overlay thereon which method comprises (a) applying to the surface of a wood substrate a coating of an aqueous thermosetting resin solution in proportions of from about 0.5 to 10 pounds, based upon resin solids, per one thousand square feet of substrate surface, (b) applying to the coated surface a layer of a mixture comprising (1) wood fibers having a bulk density of up to about 0.16 grams/cc. and (2) from about 5 to 50 weight percent of resin solids based upon dry wood fibers, of an aqueous phenol-formaldehyde resole resin solution (c) applying to the surface of the fibrous layer a coating of an aqueous phenol-formaldehyde resole solution in proportion of from about 1 to 15 pounds, based upon resin solids, per one thousand square feet of substrate surface, (d) applying to the resin coated surface of the fibrous layer a sheet selected from the group consisting of paper sheets and thermoplastic sheets, and (e) subjecting the resulting assembly to heat and pressure to consolidate the assembly; said aqueous phenol-formaldehyde resole resin solutions empolyed in steps (b) and (c) being independently selected aqueous solutions of an alkaline catalyzed phenol-formaldehyde condensate having a number molecular weight of up to about 5000 and containing an average of from 1.3 to 3.0 mols of combined formaldehyde per mol of phenol.

5. A method as in claim 4 wherein the total consolidated thickness of the overlay is from about 6 to 50 mils.

6. A wood product comprising a wood substrate having a functional overlay cohesively bonded to at least one surface thereof, as prepared by the method of claim 5.

References Cited

UNITED STATES PATENTS

| | | | |
|---|---|---|---|
| 2,360,376 | 10/1944 | Van Epps | 161—262 |
| 2,606,138 | 8/1952 | Welch | 117—65.2 |
| 2,831,794 | 4/1958 | Elmendorf | 161—162 |
| 3,134,709 | 5/1964 | Brown | 161—162 |
| 2,804,418 | 8/1957 | King | 161—262 |
| 3,180,784 | 4/1965 | Meiler | 161—262 X |

MORRIS SUSSMAN, *Primary Examiner.*